United States Patent [19]

Davis et al.

[11] 4,182,099

[45] Jan. 8, 1980

[54] IMPELLER MOWER-CONDITIONER ROTOR

[75] Inventors: Wilbur M. Davis; Bobby G. Sawyer, both of Ottumwa, Iowa; John A. Nichols, Brookston, Ind.

[73] Assignee: Deere & Company, Moline, Ill.

[21] Appl. No.: 853,035

[22] Filed: Nov. 21, 1977

[51] Int. Cl.² ............................................ A01D 43/00
[52] U.S. Cl. ................................. 56/16.4; 56/DIG. 1
[58] Field of Search ........................ 56/1, DIG. 1, 12.7, 56/13.5, 13.6, 13.7, 294, 503, 16.4, 14.4

[56] References Cited

U.S. PATENT DOCUMENTS

| | | | |
|---|---|---|---|
| 3,699,755 | 10/1972 | Hauser | 56/16.4 |
| 3,754,384 | 8/1973 | Case et al. | 56/14.4 |
| 3,896,609 | 7/1975 | Overesch | 56/13.6 |
| 4,077,192 | 3/1978 | Klinner et al. | 56/16.4 |

FOREIGN PATENT DOCUMENTS

| | | | |
|---|---|---|---|
| 2004285 | 8/1970 | Fed. Rep. of Germany | 56/DIG. 1 |
| 1922639 | 10/1970 | Fed. Rep. of Germany | 56/12.7 |
| 2364657 | 6/1975 | Fed. Rep. of Germany | 56/13.7 |

Primary Examiner—Russell R. Kinsey

[57] ABSTRACT

A tractor drawn and powered impeller mower-conditioner includes a transverse cutter bar comprising a series of pairs of side-by-side contra-rotating cutting disks. An impeller rotor with free swinging flails is mounted above and slightly to the rear of the cutter bar with its axis of rotation parallel to the cutter bar. A hood over the rotor includes a confining forward conditioning plate conforming fairly closely to the rotor periphery to form a conditioning zone and a rearwardly extending deflecting and windrow forming portion. The rotor is disposed and rotated so that the flails intercept cut material delivered rearwardly by the cutter bar and carry it, inside the hood, up and over the rotor through the conditioning zone to be discharged rearwardly into a windrow. The flow of cut material from each pair of disks tends to be concentrated into a rearwardly directed stream by the bite or convergence of the contra-rotating disks. The distribution of flails on the rotor is locally concentrated so that a center of flail concentration is longitudinally aligned with each concentration of material flow so that all material received by the rotor gets approximately uniform treatment.

7 Claims, 7 Drawing Figures

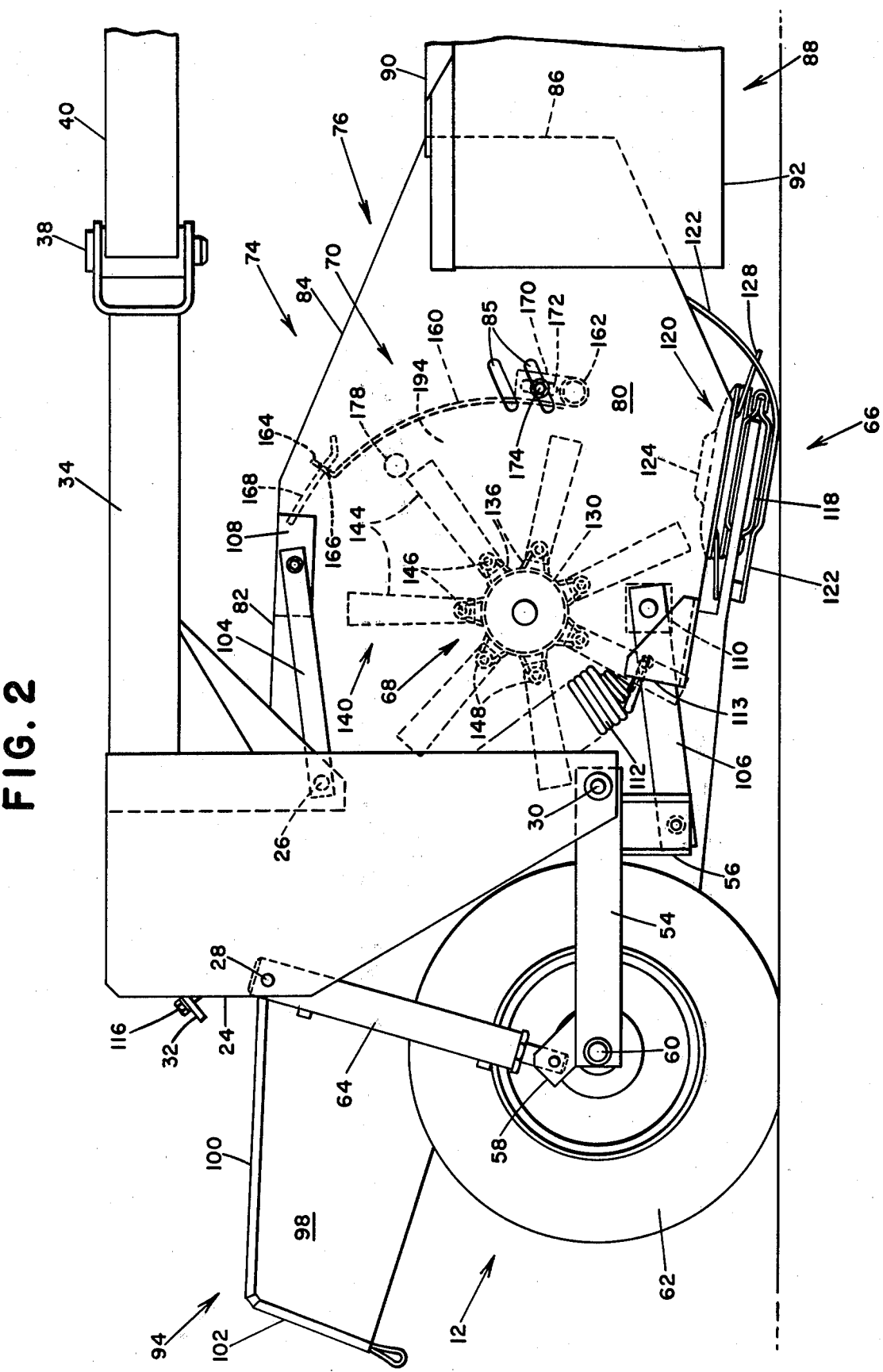

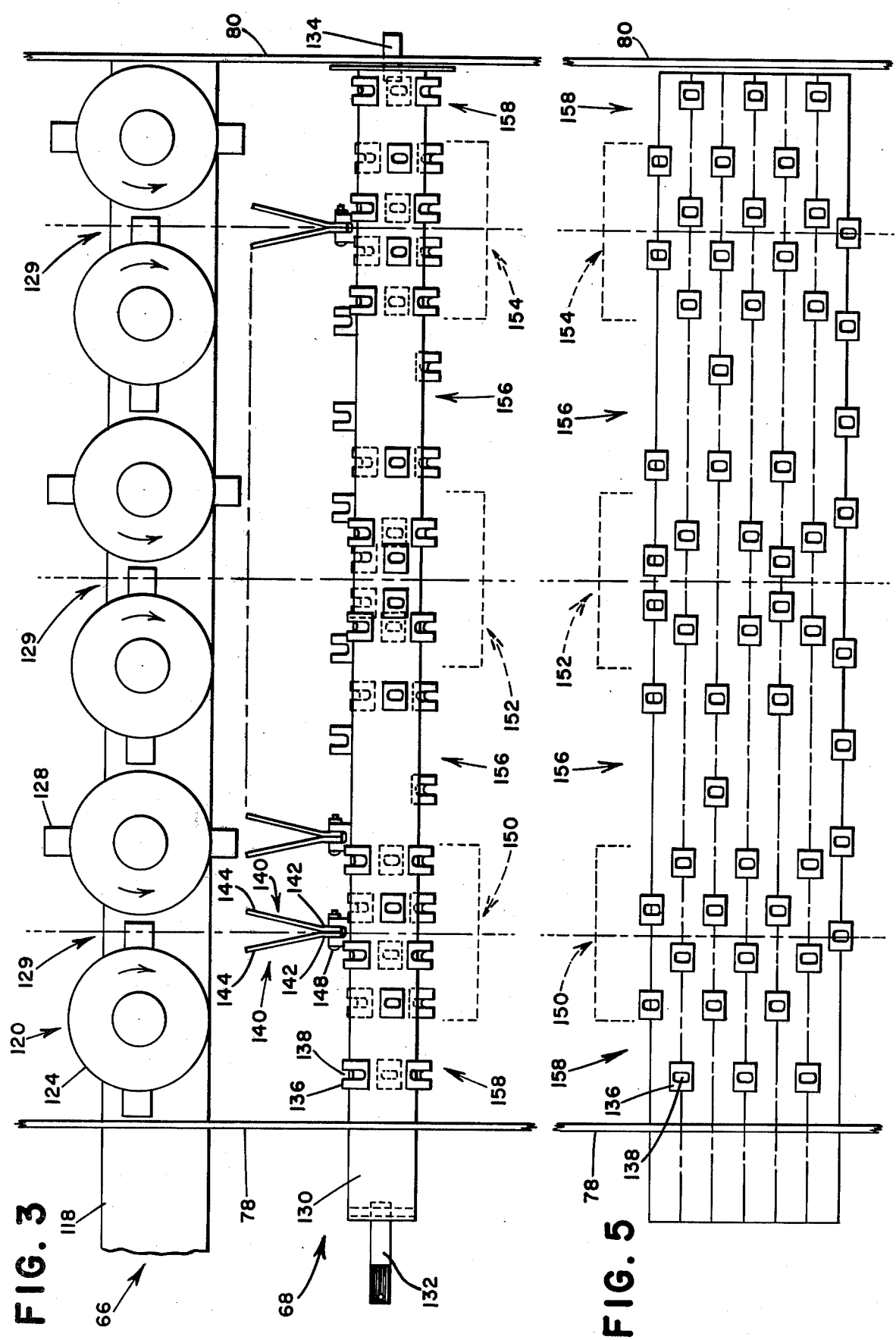

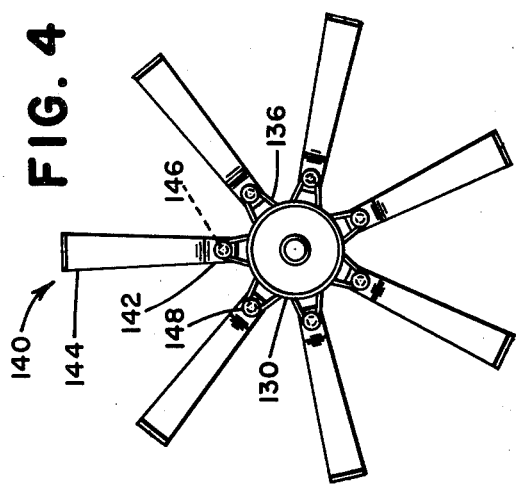
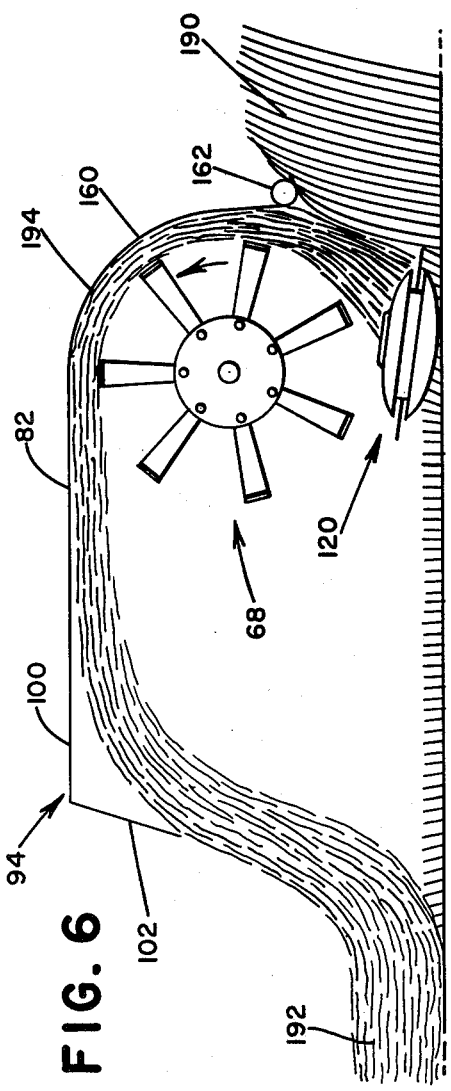
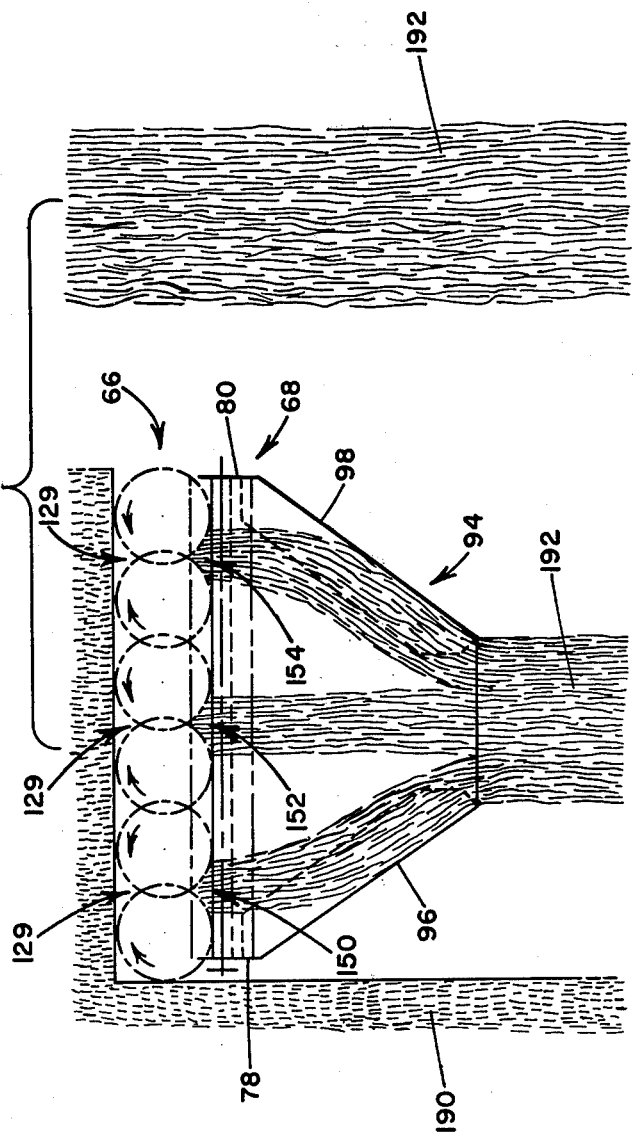

IMPELLER MOWER-CONDITIONER ROTOR

BACKGROUND OF THE INVENTION

This invention relates to a machine for cutting, conditioning and windrowing crop material such as grasses and legumes and more particularly to an improved machine in which a generally transverse rotary disk or drum cutter bar delivers cut material rearwardly to an adjacent impeller rotor, parallel to the cutter bar, for conditioning and discharge into a window.

In machines of the above type, it is typical for adjacent drums or disks to be driven in opposite directions and it is well known that such an arrangement tends to concentrate crop material in the bite between disks or drums so that the rearward discharge from the cutter bar is heavily differentiated with a concentration of material flow corresponding to each pair of disks or drums. When crop material is delivered in this way to a conditioning means which is transversely undifferentiated, the material will be unevenly treated, some receiving too much conditioning and some, where the flow of material is concentrated, receiving too little.

Attempts have been made to deal with this problem as disclosed for example in U.S. Pat. No. 3,673,779, Scarnato, et al, and French Pat. No. 2,121,333. Scarnato discloses mower-conditioners in which a disk or drum cutter bar delivers material to conditioning rolls (rather than an impeller rotor) and in which the disks or drums of the cutter bar are provided with means for throwing material "with horizontal fanning effect" into the rollers to spread the material along the length of the rollers. Although it may be possible in this way to improve distribution along the length of the rollers and hence improve uniformity of conditioning, a disadvantage of this approach is that the "fanning effect" involves a further change of direction of rapidly moving material, consuming additional power in a machine which already has an inherently high specific power cosumption.

The French Pat. No. 2,121,333 discloses an impeller mower-conditioner including a rotor having a plurality of tines, the effective length or reach of the tines being increased locally to coincide with the center of concentration of material flowing from the disk or drum cutter bar and it is argued that the resulting larger periphery of the rotor and higher tip speed of the tines in this area offset the concentration of material. But it is well understood that in a machine of this type, for adequate function, the tips of the rotors must pass relatively close to the cutter bar over the whole width of the machine and, therefore, only a limited variation in effective rotor diameter can be tolerated. The drawings of the French patent cited indicate a ratio of maximum to minimum diameter for a rotor used in conjunction with drum cutters of four to three and an even smaller ratio for a rotor used with disk cutters. However, in typical operating conditions, variations of concentration of crop material delivery along the length of the cutter bar with a ratio of at least two to one are encountered, and the variations in rotor diameter suggested by the French patent are insufficient to compensate for such a range of concentrations.

In addition, it is desirable to maintain approximately constant clearance along the length of the rotor between the tips of the rotor tines and the hood over the rotor, particularly in the area where the rotor tines are carrying crop material up and over the rotor. If a straight hood is used with a rotor having a diameter varying along its length, clearance between the rotor tine tips and the hood will vary with adverse effect on material flow. On the other hand, adoption of a hood configuration conforming at least in part to the profile of a rotor having a varying diameter would increase cost of manufacture and could cause additional direction changes in the flow of crop material with a further increase in power consumption as well as possibly adversely affecting windrow formation.

SUMMARY OF THE INVENTION

Accordingly, it is an object of the present invention to provide for an impeller mower-conditioner having a transverse rotary cutter bar including disk or drum cutting elements, a rotor for conveying and conditioning crop material which compensates for variations in the concentration of crop material delivered to its along its length.

It is a feature of the invention that the rotor is of uniform diameter and that variations in the conditioning and conveying or transporting effect of the tines or flails along the length of the rotor are achieved by increasing the number of flails per unit length of rotor to correspond with variations in the concentration of material delivered to the rotor across the width of the machine. An advantage of such a rotor is that within a given cylinder of revolution, flail arrangement can be varied to produce very large ratios of flail concentration along its length. As well as being concentrated where required, relatively fewer flails may be used in the zones of lower specific flow between the concentrated material flow zones, not only contributing to the uniformity of conditioning and velocity of material discharged into the windrow, but also minimizing power consumption by avoiding the useless windmilling of unnecessary tines in areas of low concentration.

It is a feature of the invention to improve the uniformity of velocity of crop material leaving the rotor along its length. It is well known that when a rotor is required to receive material and accelerate it circumferentially before discharging it, as is the case in the impeller mower-conditioner, slippage occurs between the crop material and the flails or tines of the rotor—that is to say that although the flails of the rotor accelerate the mass of material (including reversing the direction of at least a part of the material as it is received from the cutter bar) the average velocity of material leaving the rotor is still less than that of the tips of the flails. The provision of an increased density of flails per unit length of rotor to correspond with locally higher concentrations of crop material provides more opportunities for flails to engage elements of the crop material and it can be arranged that slippage remains fairly constant along the length of the rotor so that material leaves the rotor with approximately uniform velocity.

A further advantage of appropriate concentration of flails is the resulting uniformity of treatment or conditioning of the crop material along the length of the rotor. It can be arranged that the number of impacts or engagements between each element of material and the flails is approximately uniform across the width of the machine.

Another feature of the invention is in providing a rotor with a positive feeding characteristic, particularly through the concentration of flails adjacent the bite or convergence between two contra-rotating disks or drums. In operation there is a tendency for lighter, drier crop material to "pile up" at the bite of the cutting elements. The provision of additional tines on the rotor adjacent such points helps insure positive engagement of the crop material and more uniform feeding and less blockage of the machine.

It is another feature of the invention to provide a flail element whose mass is concentrated relatively close to its free swinging extremity. The inertia effect of having flail mass disposed at a relatively greater radius provides greater flail stability and helps insure positive feeding of crop material. For a given weight of flail, distributing flail mass in such a way produces a relatively higher conditioning impact.

BRIEF DESCRIPTION OF THE DRAWINGS

FIG. 2 is an enlarged partial right side elevation particularly showing the header assembly of the mower-conditioner.

FIG. 3 is a schematic overhead view of the cutter bar and rotor assemblies with longitudinal spacing between cutter bar and rotor increased for clarity.

FIG. 4 is an end view of the rotor.

FIG. 5 is a diagrammatic representation of the developed surface of the rotor core showing the arrangement of the flail pivot brackets.

FIG. 6 is a schematic longitudinal section illustrating the flow of crop material through the mower-conditioner.

FIG. 7 is a schematic top view illustrating the flow of crop material through the mower-conditioner.

DESCRIPTION OF THE PREFERRED EMBODIMENT

Figure 1:
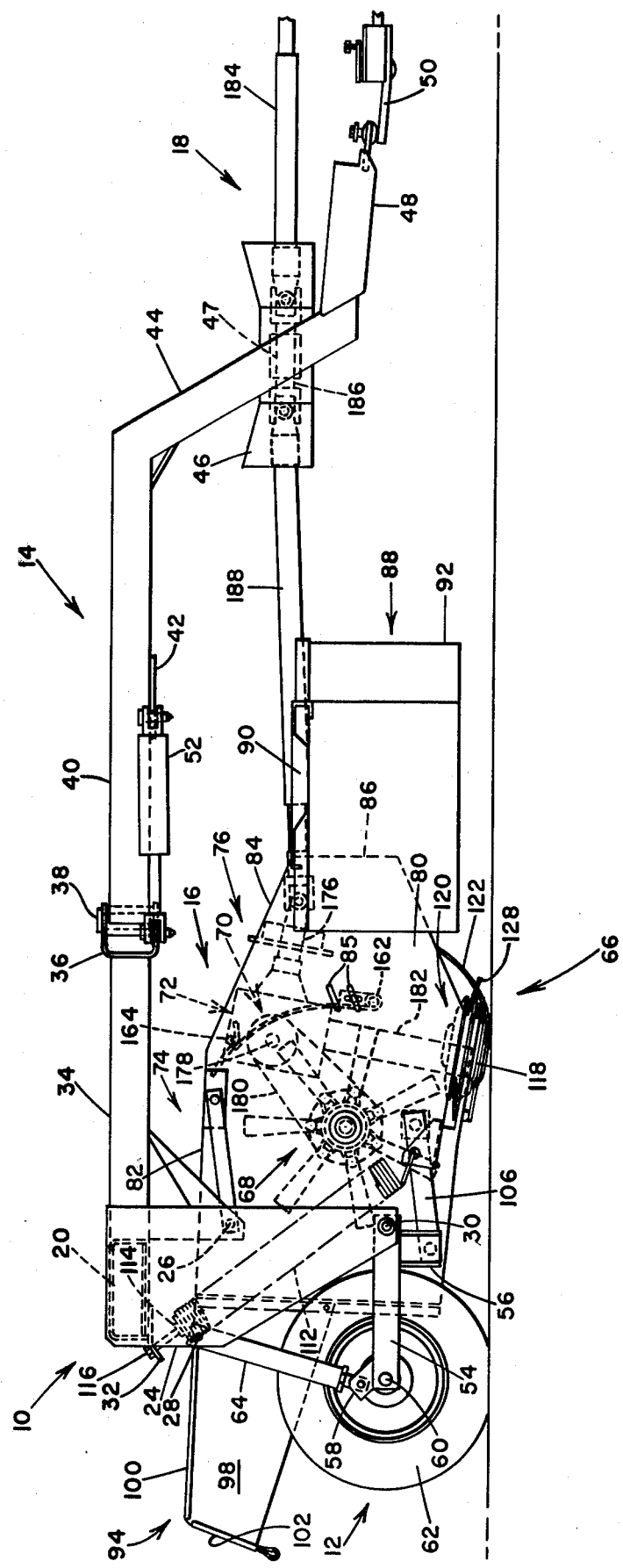
FIG. 1 is a somewhat schematic right hand side elevation of an impeller mower-conditioner embodying the invention, with the header in operating position.

The invention is embodied in an impeller mower-conditioner which includes a main frame indicated generally by the numeral 10, a pair of wheel assemblies 12 for supporting the machine above the ground, a forward extending tongue 14 for hitching to a towing vehicle such as an agricultural tractor, a header 16 carried by the main frame 10 and a power take-off drive assembly 18 for transmitting power from the towing vehicle to the header 16.

The main frame 10 includes a transverse main beam 20 (shown in end view only in the drawings) and opposite upright left and right hand depending portions or wheel drops 24, (only right hand is shown), rigidly attached to the opposite ends of the beam 20. In each wheel drop portion 24 there are three transverse pivot points, front upper 26, rear upper 28 and lower 30.

A spring anchor bracket 32 extends rearwardly and downwardly adjacent the rearward side of each of the junctions between the upright members 24 at the opposite ends of the transverse beam 20 respectively. Extending forward from the left hand end of the transverse beam 20 is a tongue support member 34, a tubular frame member of rectangular cross section, closed at its forward end by a laterally extending clevis-like member 36.

The tongue 14 is pivotally connected to the clevis-like member 36 by a pin 38 and includes a generally horizontal rear portion 40 carrying a hydraulic cylinder bracket 42 attached to its lower side and extending towards the right. The tongue also includes a power line bearing portion 44 rigidly attached to the rear tongue 40 and extending forwardly and downwardly and including a power line bearing assembly 46 having an approximately horizontal fore-and-aft bearing bore 47. A forward tongue portion 48 extends forwardly from the lower end of the power line bearing portion 44 and is designed to be hitched to the drawbar or drawbar extension 50 of a towing vehicle in a conventional manner. A hydraulic cylinder 52 for controlling the horizontal angle between the tongue 14 and the main frame 10 is connected between the cylinder bracket 42 on the rear tongue 40 and a point on the clevis member 36 towards the right hand side of said member.

Each wheel assembly 12 includes a generally fore-and-aft extending wheel support arm 54 attached for pivoting in an approximately vertical plane by its forward end to the lower pivot point 30 of the main frame wheel drops 24, respectively. Each wheel support arm 54 includes, just rearward of its forward pivot point, a downwardly extending lower float link pivot bracket 56 and, extending upwards adjacent its rearward end, a hydraulic cylinder bracket 58. A transversely extending wheel spindle 60 rigidly attached adjacent the rearward end of each wheel support arm 54 carries a wheel 62. A hydraulic cylinder 64 is pivotally connected at its ends between each rear upper pivot point 28 of the main frame legs 24, and each cylinder pivot bracket 58 and is actuated by a hydraulic power source on the tractor for raising and lowering the mower-conditioner between operating and transport positions.

The header assembly 16 (best seen in FIG. 2) is floatingly supported under the arch formed by the transverse beam 20 and the depending wheel drops 24 of the main frame 10. It includes frame members (not shown in the drawings) supporting component assemblies including a cutter bar assembly 66, a rotor 68, a conditioning plate 70, a gearbox 72 and hood 74.

The hood 74 includes a forward portion 76 having opposite upright generally fore-and-aft extending, left and right hand side sheets 78 and 80, respectively, an approximately horizontal rearward top portion 82 and a contiguous forwardly and downwardly inclined forward top portion 84. Each side sheet, 78 and 80, includes a pair of parallel inclined slots 85. The open forward hood inlet 86 defined by the forward edges of the top portion 84 and the side sheets 78 and 80 is shielded by a safety shield assembly 88 which includes a generally rectangular top portion 90 extending the full width of the hood inlet opening 86 and, depending from the forward and opposite side edges of the top 90 and reaching close to the ground, a continuous canvass safety curtain 92.

The hood 74 also includes a rearward deflector portion 94 having generally upright, left and right hand side sheets 96 (seen only in FIG. 7) and 98, respectively, contiguous with the rear edges of the forward side sheets 78 and 80, respectively, and extending rearwardly and inwardly, an approximately horizontal top 100 extending between the upper edges of the side sheets 96 and 98 and an approximately upright transverse rear sheet 102 contiguous with the rearward edges of the side sheets 96 and 98 and the top 100.

The header assembly 16 is carried by opposite pairs of approximately parallel upper and lower float links 104 and 106, respectively. The float links are pivotally connected at their respective forward ends to opposite pairs of upper and lower support plates 108 and 110, respectively, carried forward of the wheel drops 24 by the opposite forward side sheets 78 and 80, close to their upper and lower edges, respectively. The rearward ends of the float links 104 and 106 are pivotally supported at the opposite header support pivot points 26 of the wheel drops 24 and the pivot brackets 56 of the opposite wheel support arms 54, respectively, the links 104 and 106 lying nearly horizontal when the header assembly 16 is in a working position.

The header assembly 16 is biased upwards by a pair of opposite float springs 112, each spring being inclined rearwardly and upwardly and having a lower end hooked to one of a pair of opposite spring brackets 113 rigidly attached to the hood outside the forward side sheets 78 and 80, respectively, towards their lower edges. The upper end of each spring 112 carries a retaining nut 114 which is threadingly engaged by a spring tension adjusting bolt 116 passing through and anchored by one of the pair of spring anchor brackets 32 carried by the main frame 10.

The cutter bar assembly 66 is supported by the frame of the header assembly 16 and extends transversely between the opposite forward hood side sheets 78 and 80 close to the lower edges of the sheets and ahead of the lower float links 106. The cutter bar assembly 66 includes an elongated beam 118 in which are journaled a series of six equally spaced side-by-side disk cutter units 120 having axes of rotation perpendicular to the beam 118. The cutter bar assembly 66 is inclined so that the disk cutter units 120 reach forwardly and downwardly. A ground-engaging skid or shoe 122 carried at the left hand end of the cutter bar beam 118 as well as ground-engagement by the underside of the beam 118 limit the minimum cutting height of the cutter units 120.

Each cutter unit 120 includes an upper saucer-like disk or shield 124 and a pair of diametrically opposite free swinging knife sections 128 carried by the disk 124 pivoted below and extending radially beyond the periphery of the disk.

The spacing of the disk cutter units on the beam 118 is such that the paths of the knife sections 128 of adjacent cutter units 120 overlap. However, conventional gear drive means (not shown) housed in the cutter bar beam 118 are arranged so that the cutters are all driven at the same rotational speed and timed so that adjacent cutter units 120 are out of phase by approximately 90° so that there is no interference between the knife sections 128 of adjacent cutter units 120 as they rotate and so that adjacent cutter units 120 contra-rotate, the extreme left hand cutter unit 120 being driving clockwise as viewed from above, the adjacent cutter unit counterclockwise as viewed from above and so on across the cutter bar assembly as indicated in FIG. 3. There is thus for each pair of cutter units 120 a bite or crop concentration zone 129 into which the cutter units 120 tend to gather, and deliver rearwardly, severed crop material.

The rotor assembly 68 (best seen in FIG. 3) transversely spans the header assembly 16 behind and above the cutter bar assembly 66. It includes an elongated central tube or core 130, the right hand end of which is adjacent the inside surface of the forward right hand hood side sheet 80 and the left hand end of which extends a short distance through the forward left hand side sheet 78. Coaxial left and right hand shafts 132 and 134 extend from the opposite ends of the tube 130 and are journaled in bearings (not shown) carried by the header frame (not shown). A plurality of flail brackets 136 are spaced axially and circumferentially over the surface of the rotor tube 130, each bracket 136 being formed from a length of flat steel bar having a central elongated slot 138, the bar being bent into a V form and attached rigidly to the tube so that as viewed from the end of the rotor (FIG. 4) each bracket appears as a V form with the free ends of the arms of the V secured to the surface of the tube 130. The central slot 138 of each flail bracket 136 becomes in effect a circumferentially disposed notch.

The rotor also includes a plurality of free swinging flails or conditioning elements 140 arranged in back-to-back pairs, each pair carried by a separate flail bracket 136. Each flail 140 is formed from a tapered flat bar having a narrow and lighter end or pivot portion 142 and a wider and heavier opposite outer portion 144 (FIGS. 3 and 4). To place the center of mass of the conditioning elements relatively towards the periphery of the rotor, the simple outwardly tapering form has been used for the flail 140. Clearly any of a large number of alternative means could be used to achieve or enhance this concentration of mass. Each flail 140 has a mounting or pivot hole 146 close to the end of the pivot portion 142 and is bent slightly along a transverse line somewhat beyond the pivot hole 146. In assembly, the flails 140 are arranged in pairs back-to-back with the holes 146 in the pivot portions 142 aligned. The pivot portions 142 are inserted into the bracket slots 138 so that a flail retaining pin 148 may be inserted, parallel to the rotor axis, so as to retain the flails 140 but permit them to swing or pivot about an axis parallel to the axis of the rotor. Clearances in the flail pivot holes 146 and in the bracket slots 138 also permit limited sideways (axial) deflection of the flails. After assembly and as viewed circumferentially, each pair of flails 140 appears as a narrow V with its open end disposed radially outwards.

The flail brackets 136 are arranged in seven rows, the rows equally spaced circumferentially around the core tube 130, each row parallel to the axis of the rotor as indicated diagrammatically in FIG. 5. The spacing and number of brackets 136 in each row is chosen so that along the length of the rotor there are alternating zones of high and low concentration of flail brackets and hence of flails while maintaining rotational balance of the complete rotor. There are left hand, center and right hand zones of high flail concentration 150, 152 and 154, respectively, the center of each zone being in approximate longitudinal alignment with the center of a crop concentration zone 129. Each zone of high flail concentration has an axial spread approximately equal to the distance between centers of the disk cutter units 120. The zones of high concentration of flails 150, 152 and 154 are separated by two approximately equal intermediate zones of low flail concentration 156 and bounded by two approximately equal end zones 158, each end zone being approximately half the width of the zones 150, 152, 154 and 156.

The conditioning plate assembly 70 includes a conditioning plate 160 extending the full width of the header assembly 16 inside the hood forward side sheets 78 and 80. The conditioning plate 160 is of arcuate cross section supported to be approximately concentric with the rotor assembly 68. It extends circumferentially over about 75° of arc and has a lower or leading edge lying slightly below the rotor center. A tubular push bar 162 is rigidly attached to and reinforces the lower edge of the conditioning plate 160. The upper or trailing transverse edge of the conditioning plate is bent upwards to form a stiffening flange 164. For positioning and supporting the upper portion of the conditioning plate 160, notches 166 in each end of the flange 164 slidingly engage a pair of opposite fixed guide flanges 168, approximately concentric with the rotor 68 and carried by frame members of the header assembly 16 adjacent the inside walls of the forward hood side sheets 78 and 80. The push bar portion 162 of the conditioning plate assembly 70 includes at its opposite ends a pair of mounting brackets 170, each bracket having a vertical slot 172. A clamping bolt 174 on each side of the machine passes through the slot 172 and through one of the pair of inclined slots 85 in the opposite hood side sheets 78 and 80 so that the push bar 162 and leading edge of the conditioning plate 160 may be adjusted in relation to the rotor 68, the notches 166 at the trailing edge of the conditioning plate sliding to assume a new position on the guide flanges 168 as required.

The gearbox 72 includes a forward extending input shaft portion 176 and two output shafts—a laterally extending rotor drive shaft 178 driving the rotor 68 through a conventional V belt drive 180 and a downward extending cutter bar drive shaft portion 182 driving the cutter bar assembly 66 through a conventional gear drive (not shown).

The power take-off drive assembly 18 is conventional and transmits power from the power take-off shaft of a towing vehicle through a forward telescoping drive shaft assembly 184, an intermediate or transfer shaft 186 journaled in the bore 47 of the power line bearing assembly 46 housed in the power line bearing portion 44 of the tongue, and a rear telescoping drive shaft assembly 188 connected to the input shaft 176 of the gearbox 72.

In operation, the impeller mower-conditioner is advanced in a field of standing crop powered by a towing vehicle, such as an agricultural tractor, so that the disk cutting units 120 sever crop material. The effect of contra-rotation of adjacent disk cutter units 120 is that they act in pairs, as indicated in FIG. 7, each pair gathering and converging crop material across the front of the cutter bar 66 into the bite or crop concentration zone 129 between the disks, the severed material tending to be concentrated in a rearwardly directed stream.

As indicated in FIG. 6, the rearwardly directed crop material is intercepted by the flails 140 of the rotor 68 and carried at first generally upwards and then up and over the rotor 68 through a conditioning zone 194 defined by the juxtaposition of the conditioning plate 160 and the rotor to be discharged generally rearwardly and horizontally within the deflector hood 94. The arrangement of rotor and cutting means of the present embodiment in which the cut material is intercepted and carried up and over the rotor for rearward delivery is called an overshot rotor configuration. In FIG. 7, the concentration of the conditioned material delivered rearwardly from the conditioning zone 194 has been emphasized for clarity and, as indicated, the three parallel streams of material are converged inwards and downwards into a windrow 192 by the deflecting action of the left hand and right hand rear side sheets 96 and 98 and the rear hood sheet 102.

As explained above, the zones of high flail concentration 150, 152 and 154 are aligned longitudinally with the three crop concentration zones 129 so that the variations in density or concentration of delivered crop material along the length of the cutter bar 66 are matched by variations in flail concentration and the degree of conditioning of crop material and velocity of its discharge from the rotor are approximately uniform across the width of the machine. Where the crop material is densest, there are correspondingly more flails to provide the necessary impacts to give the required degree of conditioning. Further, the rotor, turning at relatively high speed, at least partially reverses the direction of flow of the material as it intercepts it at the cutter bar and, in carrying it through the conditioning zone 194, must accelerate it up to such a discharge velocity that it is discharged centrifugally from the rotor in an approximately horizontal stream. "Slippage" occurs between the flails 140 and the crop material and the material generally does not reach the tip velocity of the flails. However, the provision of the appropriate concentrations of flails compensates for the non-uniform distribution of delivered cut material across the width of the machine so that slippage and hence discharge velocity, is approximately constant across the width of the machine. Uniformity of discharge velocity helps build better windrows.

The extra flail population in the vicinity of the crop concentration zones 129 makes the rotor more aggressive and able to feed material more positively away from the cutter bar helping to avoid blockages, especially with light, fluffy crop material. Rotor performance is also enhanced by the concentration of individual flail mass relatively towards the periphery of the rotor. For a given rotor weight and speed, greater kinetic energy is available in the radially outward portion of the flail to provide a smoother transporting and conditioning function than if flails of uniform cross section were used.

The partial wrapping or shrouding of the rotor 68 by the forward portion 76 of the hood and more particularly by the conditioning plate 160 contains crop material in a controlled relationship with the flails 140 in the conditioning zone 194. The process of conditioning the crop material, begun when the material is first intercepted by the flails at the cutter bar, is completed while the material is being accelerated for rearward discharge into the windrow 192.

As indicated in FIGS. 3 and 5, the zones of high flail concentration 150, 152 and 154, each contain about twice as many pairs of flails 140 (12 or 13 pairs) as do the zones of low flail concentration 156 (6 pairs). The zones are of approximately equal axial length and there are thus about twice as many conditioning elements per unit length of rotor in a high concentration zone as in a low concentration zone. Such a ratio has been found to be particularly effective in a mower-conditioner in which the individual disk cutting elements are spaced about 15 inches apart and is indictive of the order of variation of concentration of flails along an impeller that is required for uniform conditioning of crop material delivered to it.

We claim:
1. In a mobile impeller type mower-conditioner for cutting standing crop material, conditioning it and depositing it in a windrow, said mower-conditioner having a transversely extending cutting means having opposite ends and tending to concentrate cut material in a generally rearwardly directed stream, and a frame, an improved impeller rotor disposed to receive crop material from the cutting means comprising:
an elongated core rotatably mounted in the mower-conditioner frame and having a transversely disposed axis of rotation generally parallel to the cutting means; and an uninterrupted array of generally radially extending conditioning elements carried by the core, spaced axially and circumferentially and extending substantially from end to end of the cutting means for engaging the crop material delivered by the cutting means, the spacing between said conditioning elements being reduced on a portion of the core approximately aligned with the rearwardly directed stream of crop material so as to define a zone of high conditioning element concentration and adjacent zones of lower conditioning element concentration.

2. A mobile mower-conditioner for advancing over a field to cut and condition a crop comprising:

a frame;

a transversely disposed elongated cutting means carried by the frame having opposite ends and including means tending to concentrate cut crop material into a plurality of generally rearwardly directed streams;

a rotor mounted in the frame and having an axis of rotation generally parallel to the cutting means and including an elongated core and an uninterrupted array of generally radially extending conditioning elements carried by the core, said conditioning elements being variably distributed on the core so as to define axially contiguous zones of greater and lesser concentration of conditioning elements, each zone of greater concentration being disposed to intercept a rearwardly directed stream of crop material and said zones together extending substantially from end to end of the cutting means.

3. An impeller mower-conditioner for advancing over a field to cut, condition and windrow crop material comprising:

a frame having opposite sides;

a plurality of pairs of contra-rotating cutting elements for cutting the crop material and delivering it rearwardly as the mower-conditioner advances, said elements being carried in transverse array by the frame, said array having opposite ends and each pair of elements having a forwardly directed bite and said bites being transversely spaced;

an impeller transversely and rotatably mounted in the frame and disposed to intercept crop material delivered rearwardly by the cutting elements and including an uninterrupted array of conditioning elements spaced along and around the impeller and extending substantially from end to end of the cutting means, the number of elements per unit length of impeller being varied so as to define a plurality of axially contiguous zones of alternately greater and lesser concentration of conditioning elements, the spacing of said zones of greater concentration matching the transverse spacing of the bite of said pairs of rotary cutting elements;

a hood carried by the frame extending between the opposite sides and including a forward portion partially wrapping the impeller in a material controlling relationship and a rearward extending deflector portion;

drive means for rotating the cutting elements; and drive means for rotating the impeller so that crop material intercepted by the impeller is carried over the top of the impeller inside the hood and discharged rearwardly into the deflector portion of said hood.

4. The invention defined in claim 3 wherein the zones of greater concentration of conditioning elements are in longitudinal alignment respectively with the bites of the pairs of cutting elements.

5. The invention defined in claim 3 wherein the rotating impeller defines a cylinder disposed above and rearwardly of the bite of the pairs of cutting elements.

6. The invention defined in claim 3 wherein the ratio of the number of conditioning elements per unit length of impeller in a zone of greater concentration to the number of conditioning elements per unit length of impeller in a zone of lesser concentration is approximately two.

7. The invention defined in claim 3 wherein the zones of greater concentration of conditioning elements are in longitudinal alignment respectively with the bites of the pairs of cutting elements and the axial extent of each zone of high concentration is equal to approximately half the axial spacing between the pairs of cutting elements.

* * * * *